United States Patent [19]
Ginsburgh et al.

[11] 4,210,868
[45] Jul. 1, 1980

[54] METHOD FOR DETECTING AN UNDERGROUND FLAME FRONT USING RESISTANCE PROBES

[75] Inventors: Irwin Ginsburgh, Morton Grove; John D. Mc Collum, Naperville, both of Ill.

[73] Assignee: Standard Oil Company (Indiana), Chicago, Ill.

[21] Appl. No.: 925,177

[22] Filed: Jul. 17, 1978

[51] Int. Cl.² ............................................. G01V 3/02
[52] U.S. Cl. ................................. 324/323; 324/65 R; 324/354
[58] Field of Search ................. 324/1, 9, 10, 62, 65 R, 324/71

[56] References Cited
U.S. PATENT DOCUMENTS

| | | | |
|---|---|---|---|
| 689,849 | 12/1901 | Brown | 324/1 |
| 727,077 | 5/1903 | Brown | 324/1 |
| 817,749 | 4/1906 | Brown | 324/1 |
| 2,035,943 | 3/1936 | Broughton-Edge | 324/1 |
| 3,031,762 | 5/1962 | Parker | |
| 3,329,891 | 7/1967 | Todd | 324/10 |
| 3,454,365 | 7/1969 | Lumpkin et al. | |
| 3,483,730 | 12/1969 | Gilchrist et al. | |

OTHER PUBLICATIONS

Satter, Abdus, *Application of Infrared Sensing to Track Thermal Flood Fronts*, Pan American Petroleum Corp. Memorandum, May 4, 1967.
Kazemi et al., *Locating a Burning Front by Pressure Transient Measurements*, Soc. of Petrol. Engnrs. of Aime Paper No. SPE1271, Oct., 1965.
Van Poolen, H. K., *Transient Tests Find Fire Front in an in situ–Combustion Project*, Oil and Gas Journal, vol. 63, No. 5, Feb. 1, 1965, pp. 78–80.

*Primary Examiner*—Gerard R. Strecker
*Attorney, Agent, or Firm*—Ronald C. Petri; William T. McClain; William H. Magidson

[57] ABSTRACT

Disclosed is a method for detecting the flame front in the in situ combustion of a subterranean carbonaceous stratum which comprises providing two or more resistance probes inserted into the ground electrically connected in one or more circuits capable of measuring the resistance between pairs of said probes, and monitoring the change in resistance in one or more of said circuits as an indication of the extent and movement of said flame front.

7 Claims, 4 Drawing Figures

MODIFIED WHEATSTONE BRIDGE CIRCUIT

MODIFIED WHEATSTONE BRIDGE CIRCUIT

MODIFIED WHEATSTONE BRIDGE CIRCUIT

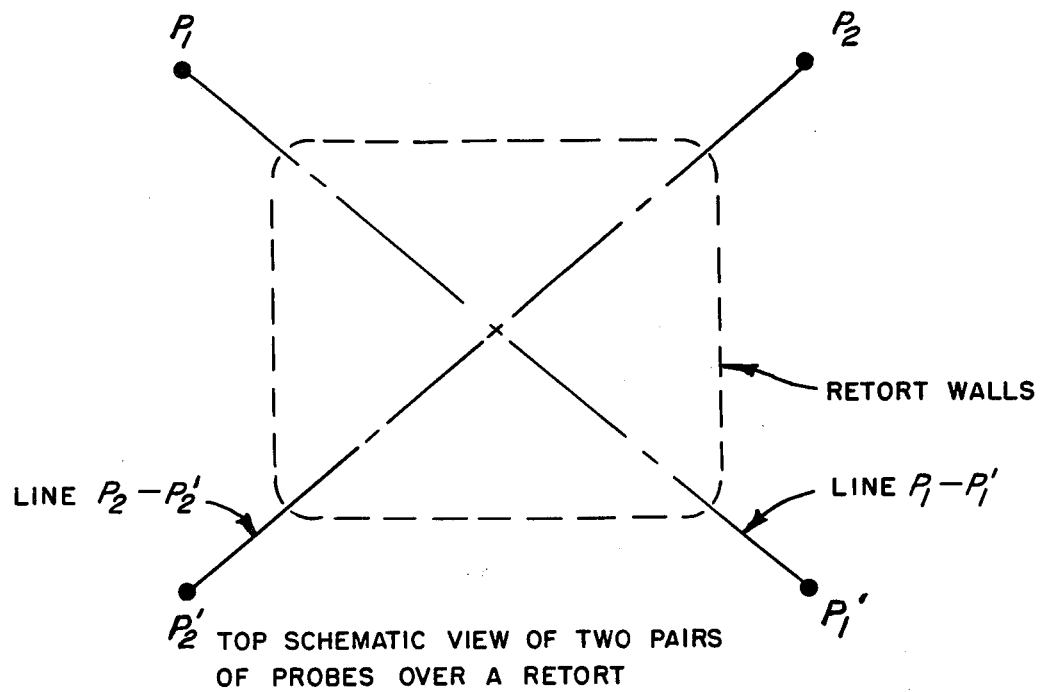
TOP SCHEMATIC VIEW OF TWO PAIRS OF PROBES OVER A RETORT
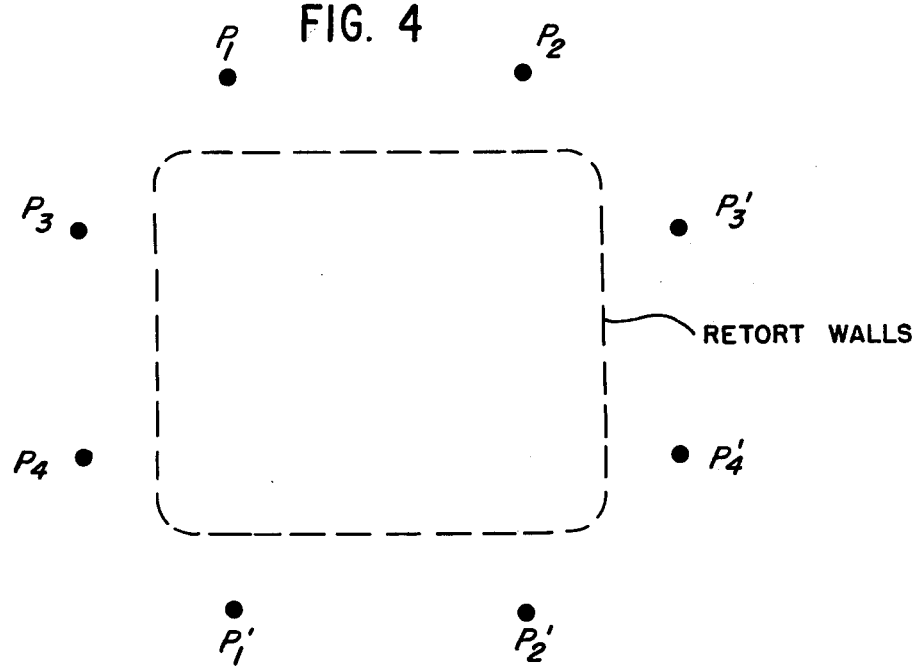
TOP SCHEMATIC VIEW OF PHYSICAL ARRANGEMENT OF AN ARRAY OF RESISTANCE PROBES

METHOD FOR DETECTING AN UNDERGROUND FLAME FRONT USING RESISTANCE PROBES

1. Field of the Invention

This invention relates to a method of monitoring the progress and pattern of a combustion or flame front being advanced through a combustible subterranean carbonaceous stratum. In particular, this invention relates to a method of monitoring both the vertical and lateral movement of an underground flame front. More particularly, this invention relates to a method of monitoring the pattern and spatial orientation of a flame front during in situ retorting of oil shale.

2. Description of the Prior Art

The term oil shale refers to sedimentary deposits containing organic materials which can be converted to oil shale. Oil shale contains an organic material called kerogen which is a solid carbonaceous material from which shale oil can be retorted. Upon heating oil shale to a sufficient temperature, kerogen is decomposed and a liquid product is formed.

Oil shale can be found in various places throughout the world, especially in the United States in Colorado, Utah and Wyoming. Some especially important deposits can be found in the Green River formation in Piceance Basin, Garfield and Rio Blanco counties, and northwestern Colorado.

Oil shale can be retorted to form a hydrocarbon liquid either by in situ or surface retorting. In surface retorting, oil shale is mined from the ground, brought to the surface, and placed in vessels where it is contacted with hot retorting gases. The hot retorting gases cause shale oil to be freed from the rock. Spent retorted oil shale which has been depleted in kerogen is removed from the reactor and discarded.

In situ combustion techniques are being applied to shale, tar sands, Athabasca sand and other strata in virgin state, to coal veins by fracturing, and to strata partially depleted by primary and even secondary and tertiary recovery methods.

In situ retorting oil shale generally comprises forming a retort or retorting area underground, preferably within the oil shale zone. The retorting zone is formed by mining an access tunnel to or near the retorting zone and then removing a portion of the oil shale deposit by conventional mining techniques. About 5 to about 40 percent, preferably about 15 to about 25 percent, of the oil shale in the retorting area is removed to provide void space in the retorting area. The oil shale in the retorting area is then rubblized by well-known mining techniques to provide a retort containing rubblized shale for retorting.

A common method for forming the underground retort is to undercut the deposit to be retorted and remove a portion of the deposit to provide void space. Explosives are then placed in the overlying or surrounding oil shale. These explosives are used to rubblize the shale and preferably form rubble with uniform particle size. Some of the techniques used for forming the undercut area and the rubblized area are room and pillar mining, sublevel caving, and the like.

After the underground retort is formed, the pile of rubblized shale is subjected to retorting. Hot retorting gases are passed through the rubblized shale to effectively form and remove liquid hydrocarbon from the oil shale. This is commonly done by passing a retorting gas such as air or air mixed with steam and/or hydrocarbons through the deposit. Most commonly, air is pumped into one end of the retort and a fire or flame front initiated. This flame front is then passed slowly through the rubblized deposit to effect the retorting. Not only is shale oil effectively produced, but also a mixture of off-gases from the retorting is also formed. These gases contain carbon monoxide, ammonia, carbon dioxide, hydrogen sulfide, carbonyl sulfide, and oxides of sulfur and nitrogen. Generally a mixture of off-gases, water and shale oil are recovered from the retort. This mixture undergoes preliminary separation (commonly by gravity) to separate the gases, the liquid oil, and the liquid water. The off-gases commonly also contain entrained dust and hydrocarbons, some of which are liquid or liquefiable under moderate pressure. The off-gases commonly have a very low heat content, generally less than about 100 to about 150 BTU per cubic foot.

One problem attending shale oil production in in situ retorts is that the flame front may "channel" through more combustible portions of the rubble faster than others. The resulting uneven passage of the flame can leave considerable portions of the rubblized volume bypassed and unproductive. Such channeling can result from non-uniform size and density distributions in the rubblized shale. If the shape of the flame front can be defined or packing variations detected within the retort, then channeling and its effects can be mitigated by controlling the air injection rate and oxygen content into various sectors of the retort, or by secondary rubblization if regions of poor density can be mapped.

A variety of prior art techniques have been established for determining the position and progress of underground combustion. These techniques range from indirect theoretical mathematical formulations on the one hand to rather simplistic direct measurements that can be done at the combustion site on the other. One example of the mathematical treatment can be found in a paper ("Locating a Burning Front by Pressure Transient Measurements," Paper No. SPE 1271) by Hossein Kazemi delivered at the October, 1965, Society of Petroleum Engineers Conference. Kazemi disclosed a method by which the distance from a measuring point to the combustion front could be calculated employing pressure transient measurements. In particular, the pressure fall-off observed at the bottom of the well hole in either injected liquid or in effluent gases could be related to the approach of a combustion front. Such pressure build-up and fall-off measurements were also described by H. K. Van Poolen in the Feb. 1, 1965 *Oil and Gas Journal*, Vol. 63, No. 5.

An equally elaborate technique was described by Dr. A. M. Feder in 1967 ("Infrared Sensing: New Way to Track Thermal Flood Fronts," *World Oil* (April, 1967), p. 142) using an infrared system to locate subterranean thermal fronts by flying an infrared sensor over the investigated area. Thermal energy from a sub-surface heat source (combustion or steam-fronts) may be transferred to the terrain surface by conduction through the overburden formation, or by movement of heated water or gases to the surface via fractures. Infrared imaging would then be useful to identify the hot portions of the surface terrain. This method however is only a gross estimate of the position of an underground thermal front and does not yield reliable data on its depth, extent or movement.

Parker discloses in U.S. Pat. No. 3,031,762 the periodic measurement of the elevation of the ground at one or more points directly above the path of a combustion front until the ground at this point rises. Such a rise is interpreted to indicate the arrival of the combustion front directly under the elevated point. This method is dependent on the fact that combustion of a carbonaceous stratum causes an expansion of the stratum which is substantially immediately translated to a rise in the elevation of the ground surface directly over the expanded stratum. This method is uniquely applicable to combustion fronts which are primarily vertical and which move in a horizontal direction. Combustion fronts in the horizontal plane that propagate vertically would simply result in a roughly symmetrical elevated area with no information provided concerning the depth or speed of the front.

Parker also teaches in U.S. Pat. No. 3,072,184 a fuel pack in which separate masses of gas forming materials are spaced in the fuel pack at predetermined distances. Thus as the fuel pack burns it releases identifiable gases at spaced intervals which, when detected in the effluent gases, can be related to the progress of the combustion front in that particular fuel pack. This method is primarily useful in well bores and is not readily amenable to application in underground retorting.

U.S. Pat. No. 3,454,365 issued to Lumpkin et al discloses a method in which the gas from in situ combustion process is analyzed for its oxygen, carbon dioxide, hydrogen and hydrocarbon content. A small sample stream from the hot effluent during in situ combustion is treated, condensed and dried. It is subsequently analyzed to determine the relative concentrations of the various off-gases. This concentration level is then rationalized through a control computer which controls the air injection rate to maintain an optimum utilization of the oxygen in the air stream and to optimize the in situ cracking process. This process is directed primarily towards detecting the efficiency or effectiveness of the combustion process within the retort, and does not provide usable information concerning the speed, progress, extent or location of the flame front within the retort.

In U.S. Pat. No. 3,467,189, Dingley also employs a sample-and-analysis technique to detect the approach of a flame front. Physical properties such as the water to air ratio of the formation fluids which enter a production well are monitored, as well as the hydrogen ion concentration and the salinity of the water and the specific gravity of the liquid hydrocarbons. A signal indicating the close proximity of the combustion front to the production well is provided when limiting or static values are reached at the same time in any two of the physical properties of the formation fluids entering the production valve.

U.S. Pat. No. 3,483,730, issued to Gilchrist et al, employs thermocouples to monitor the change in temperature of the overburden near the ground surface at a plurality of points spaced around the point at which the combustion is initiated. These thermocouples respond to changes in temperature of the overburden during the heat movement of the underground combustion and thereby detect lateral movement of the flame front.

Related to the teachings of U.S. Pat. No. 3,483,730 is a method involving down-hole placement of temperature-sensing devices which indicate a sharp rise in temperature as the flame front arrives at the locus of the temperature-sensing device. One disadvantage in this method lies in the fact that the extremely high temperatures of the combustion front frequently destroy the temperature-sensing apparatus. Another disadvantage is in the cost of drilling holes to the formation level.

The technique of self-potential profiling, long used to locate mineral deposits, has recently been found to be useful as a tool for locating buried geothermal reservoirs. This technique involves the detection of small self-potential voltages which result from natural earth currents. Two metal stakes are placed in conductive ground and connected to a sensitive voltmeter which detects the generation of electromotive force in the surrounding rocks due to increases in temperature. The effective range of this method is somewhat limited and dependent upon a large area of thermal variation to generate a measurable voltage. In an underground retort however, very poor electrical coupling exists between the rubble and the retort walls. It is expected that any self-potential voltages generated within the retort will be poorly transmitted to the walls. Therefore, the self-potential voltages detectable by the surface sensors will be primarily those generated from the immediately adjacent retort walls—a much smaller thermal source than the entire flame front. This significantly reduces the efficacy of this method in underground retorting. Like the infrared imaging technique this method adequately detects the presence of thermal anomolies, but provides little information concerning the depth or movement of such thermal fronts.

Scientists at the Lawrence Livermore Laboratories have recently explored the use of high frequency electromagnetic probing to investigate underground anamolies. One application of the radiofrequency (RF) probing is to observe the progress of a burn front in the experimental underground coal gasification process. This technique involves lowering radio transmitters and receivers into bore holes drilled around the area of concern. Underground irregularities which have an effect on the passage of the RF waves can then be detected and located. Varying geological features, however, also affect the passage of the RF waves. In addition, underground water pockets, or any other interface causing a change in the dielectric constant, would also affect the passage of the RF waves. This method is therefore susceptible to interference caused by the presence of normal subterranean features.

It can be seen that the methods taught by the prior art are, in general, directed towards either (1) detecting lateral movement of a flame front, or (2) the vertical movement of a flame front, but not both. In addition, even those methods which are capable of detecting the directional movement and location of the front do not provide a means for ascertaining whether the front is tilted out of a desired orientation. Such tilts are undesirable as they can cause incomplete or inefficient combustion in the retort. In general, the prior art does not provide a means of detecting both the lateral and vertical location of a flame front, the speed with which the flame front is propagating through the carbonaceous stratum and the degree to which the front deviates from a desired horizontal or vertical plane. Once these parameters of the underground flame front are detected, various means can be employed to selectively speed up or hinder portions of this flame front to more efficiently effectuate the retorting process.

The general object of this invention is to provide a method of determining the progress and pattern of a combustion front in a carbonaceous stratum which avoids the aforesaid difficulties. A more specific object of this invention is to provide a method of determining both the vertical and lateral movement of an underground flame front. Another object of this invention is to provide a means of ascertaining the spatial orientation of the plane of an underground flame front.

SUMMARY OF THE INVENTION

The objects of this invention can be achieved through a method for detecting the flame front during the in situ combustion of a subterranean carbonaceous stratum which involves providing two or more resistance probes inserted into the ground electrically connected in one or more circuits capable of measuring the resistance between pairs of said probes, and monitoring the change in resistance in one or more of said circuits as an indication of the extent and movement of said flame front.

The extent (i.e., the location and tilt) and movement of an underground flame front can be determined utilizing the fact that the electrical conductivity of a burning layer of material is greater than the conductivity of that same material prior to combustion. As previously noted the rubblized shale in a retort makes poor electrical coupling with the solid walls of the retort. As the shale burns, however, the flame front becomes a better electrical conductor than both the unburnt rubble and the solid overburden. The net effect at the surface is that the flame front appears to be a plane of electrical conducting material imbedded in the ground, a relative insulator. As the flame front burns through the retort, the conducting layer changes position with respect to the surface.

Under ordinary circumstances, the electrical resistance of the ground can be expected to be very high. That is, when two resistance probes are placed into the ground some distance apart, the resistance measured between these probes is very high. However, when two resistance probes are placed outside the boundaries of an expected underground combustion site (this can be a retort, a seam of coal or some other feature amenable to in situ combustion techniques) the resistance between the probes shows a marked decrease at the ignition or arrival of the flame front beneath and between the probes. This is due to the fact that the flame front is more capable of conducting an electrical current than its surroundings. In effect, the flame front "shorts out" the initial high resistance between the probes, yielding a resistance measurement reflecting a more conductive path. As the flame approaches the vicinity of the probes, the conductive path length of the current (from one probe, through the ground, through the flame front, to the other probe) decreases, resulting in a decrease in the resistance between the probes—reaching a minimum when the front is just beneath and between the probes. As the flame front recedes, the path length and resistance measurements both increase. The change in electrical resistance between the probes is monitored as the burn progresses and the location of the flame front relative to the probes is related to the magnitude of the change in resistance.

The method can be employed to detect the flame front in cases where the combustion is expected to proceed vertically (as in a retort), laterally or even in cases where the direction of the combustion is erratic or unknown. When placed across the path of a lateral combustion site, the probe method of this invention is capable of tracking the approach and recession of the flame front as well as the speed of propagation. In vertical or retort combustion, the probes are capable of monitoring the location, movement and spatial orientation of the flame front.

A significant factor in applying this method to a variety of combustion sites is that the probes should be placed in the ground and a resistance measurement taken prior to the approach or ignition of the flame front. This reference reading is taken prior to any perturbations caused by the flame front. The flame front's progress and distance is then determined by monitoring deviations from the reference reading caused by the advance of the front.

Limited only by the desirability of obtaining an initial "flame-free" or reference reading, the probes can be placed ahead of the advancing front in lateral combustion, or spaced in pairs in an array to track the progress of underground combustion with amorphous characteristics. The preferred direction of combustion is vertical, however. In vertical combustion, or more specifically, in vertical underground retorting of rubblized shale, the profile or boundary of the flame front remains relatively well defined by the sidewalls during the entire retorting process. Further, vertical combustion has the advantage that the immobile probes remain directly over the flame front for the duration of the combustion.

BRIEF DESCRIPTION OF THE DRAWINGS

FIG. 3 is a schematic top view of two pairs of resistance probes situated around the periphery of an underground retort.

FIG. 4 is a schematic top view of four pairs of resistance probes situated around the periphery of an underground retort.

DETAILED DESCRIPTION OF THE INVENTION

Figure 1:
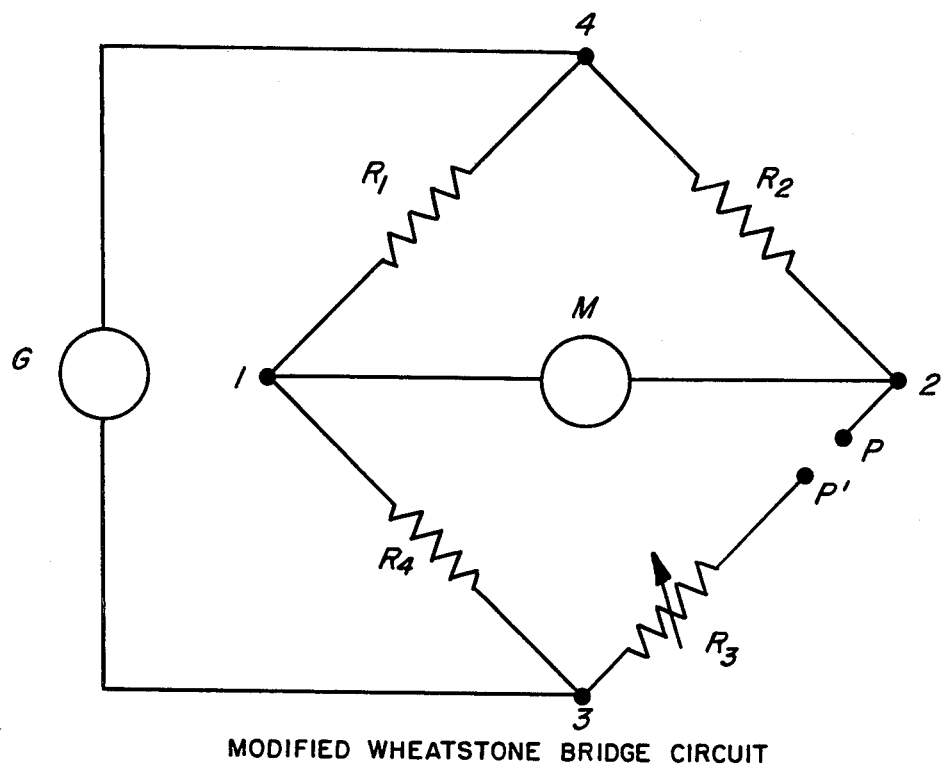
FIG. 1 is a schematic diagram of a modified Wheatstone Bridge circuit employing one pair of probes.

While a flame front becomes a relative conductor when compared to its surroundings, the detected decrease in resistance at the surface of the ground (perhaps hundreds of feet away) is very small and direct quantitative measurements are generally difficult. Therefore, a monitoring method that is sensitive to very small changes in resistance is desirable. A bridge circuit provides such a sensitive method. A typical bridge circuit may employ a pair of probes as one branch of the bridge. A modified Wheatstone Bridge circuit is established as shown in FIG. 1. A pair of resistance probes P and P' are connected in the bridge circuit with three resistors of predetermined value. A variable resistor $R_3$ is connected in series with the probes P and P'. A current (either direct or alternating) is applied across the bridge by G. A sensitive meter M is connected as shown. In effect, M is a very sensitive galvanometer capable of detecting very small currents. There are four primary junction points in the circuit—M is connected across junction points 1 and 2; G is connected across junction points 3 and 4.

Such bridge circuits are very useful in detecting very small current or resistance variations. A so-called "balance" condition is first attained by adjusting the variable resistor $R_3$ until meter M detects zero current. In this condition, the electrical potential at point 1 is exactly equal to the electrical potential at point 2 and no current is flowing through M's portion of the circuit.

The configuration of FIG. 1 will be recognized as a modification of the familiar Wheatstone Bridge wherein one branch (3-2) contains a pair of resistance probes and a variable resistor. Thus, at balance conditions the familiar Wheatstone Bridge formula can be written, with reference to FIG. 1, as $$R_{14}/R_{42} = R_{13}/R_{32}$$

where
$R_{14}$ is the effective resistance of the 1-4 branch of the bridge,
$R_{42}$ is the effective resistance of the 4-2 branch,
$R_{13}$ is the effective resistance of the 1-3 branch, and
$R_{32}$ is the effective resistance of the 3-2 branch.

Accordingly, any change in the effective resistance of any branch of the circuit will result in an imbalance of the bridge and a nonzero current reading at M. One advantage of a bridge circuit is that the sensitivity of the meter M can be chosen such that even a very small change in any branch of the circuit causes a relatively large deflection in M. As a consequence, a weak perturbation of the circuit can be made easily observable at M and distinguishable from all other background factors which do not directly affect the balance of the bridge.

In application, probes P and P' are driven some distance into the ground and the "flame-free" balance condition achieved by adjusting $R_3$ until M reads 0. After ignition or arrival of the flame front, the effective resistance between P and P' will alter, thereby unbalancing the bridge and causing a non zero reading at M. To reachieve balance, $R_3$ is adjusted until M again reads 0. The amount of adjustment of $R_3$ is related to the change in resistance between P and P' caused by the presence of the conducting flame front. As the conducting front approaches or recedes from P—P', changes in the balance of the bridge are detected at M. The speed of the movement of the conducting front relative to P—P' will also be reflected in the rate of change of the balance. Consequently, monitoring the speed and magnitude of the imbalance at M indicates the location and movement of the flame front. This method provides, therefore, a direct link between (1) the magnitude of the adjustment of $R_3$ which is necessary to re-establish balance, and (2) the proximity of a conducting flame front to probes P—P'.

The arrangement just described, wherein one pair of probes is located over, or in the path of, a flame front yields information primarily only in one dimension. That is, information concerning distance between the probes and the flame front is readily obtained but the orientation or tilt of the front remains generally unknown.

Figure 2:
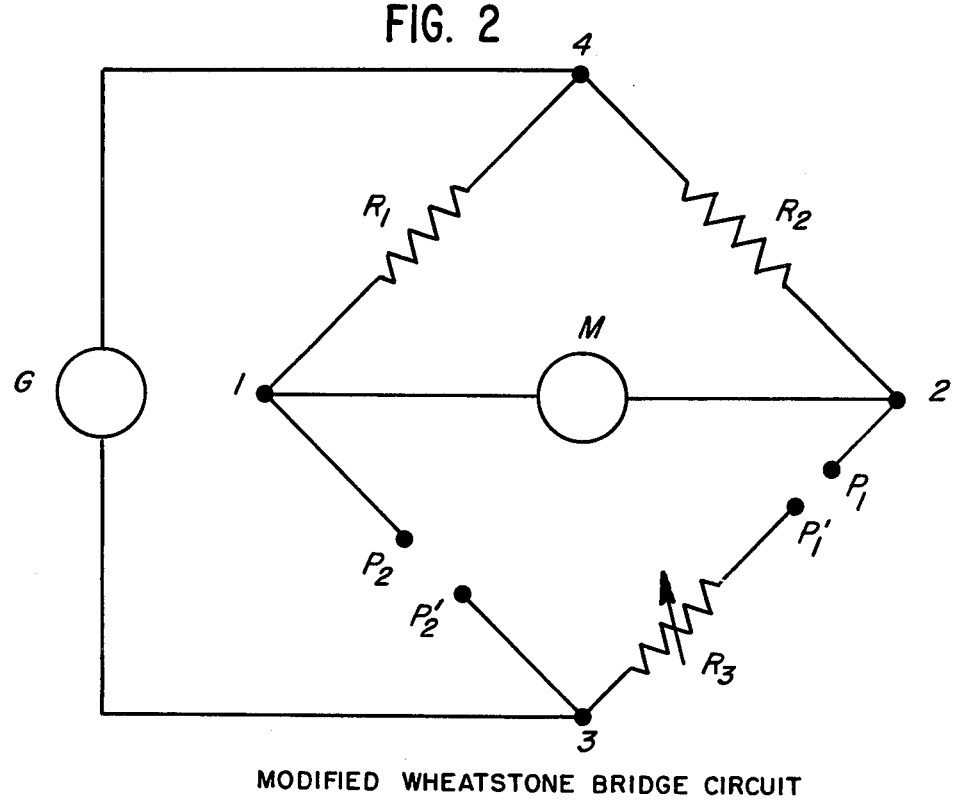
FIG. 2 is a schematic diagram of a modified Wheatstone Bridge circuit employing two pairs of probes for use in detecting the orientation of a flame front.

Information concerning the orientation of the flame is obtained from another embodiment of this invention employing a second modified Wheatstone Bridge of FIG. 2, two pairs of probes are placed so that they are substantially symmetrical about the center and outside the boundaries of the combustion site. When this embodiment is used in the retorting process, each pair of probes is placed directly above the stratum to be burned and around the periphery of the sidewalls of the retort. As shown in FIG. 2, each pair of probes $P_1$—$P_1'$ and $P_2$—$P_2'$ are placed in a separate branch of the bridge circuit and the variable resistor $R_3$ is again placed in series with one of the pairs. A balance is once again achieved prior to ignition or arrival, and the balance monitored as the combustion progresses. A typical arrangement of the probes in this embodiment when used over a retort is shown in FIG. 3. It can be seen that so long as the flame front remains horizontal the distance between the conducting front and $P_1$—$P_1'$ remains roughly equal to the distance between the conducting front and $P_2$—$P_2'$. In the event that a portion of the flame front directly below line $P_1$—$P_1'$ advances at a different rate than the portion of the flame front directly below line $P_2$—$P_2'$, then the resistance between $P_1$ and $P_2'$ will differ from the resistance between $P_2$ and $P_2'$.

A horizontal flame front results in the flame front remaining roughly equidistant from both pairs of probes. This condition does not appreciably disturb the balance of the bridge. The resistance between $P_1$ and $P_1'$ is affected to roughly the same degree as the resistance between $P_2$ and $P_2'$. A "tilted" flame front, however, substantially unbalances the bridge because each pair of probes is responding to a different distance to the conducting flame front, and thereby "senses" a different resistance. The degree of imbalance is related to the severity of the tilt. Further, whether the variable resistor $R_3$ needs to be increased or decreased to regain balance conditions is related to whether the $P_1$—$P_1'$ resistance is larger or smaller than the $P_2$—$P_2'$ resistance. Consequently, monitoring the degree and direction of the imbalance of a four probe bridge yields information concerning the spatial orientation of the flame front.

Another embodiment of the invention provides improved accuracy through the use of multiple bridge circuits. When arranged in an array as in FIG. 4 each pair of probes is situated over a portion of the underground retort, and again, just outside the boundaries of the sidewalls. Opposite pairs ($P_1$—$P_1'$ and $P_2$—$P_2'$; $P_3$—$P_3'$ and $P_4$—$P_4'$) are connected in a bridge circuit similar to FIG. 2 so that any imbalance existing between, for example, the $P_1$—$P_1'$ and $P_2$—$P_2'$ resistances is monitored. If pairs $P_1$—$P_1'$ and $P_2$—$P_2'$ do not "feel" the presence of similar conductors then the $P_1P_1'P_2P_2'$ bridge circuit will be unbalanced. Similarly any discrepancies in the conductors sensed by pairs $P_3$—$P_3'$ and $P_4$—$P_4'$ will result in the imbalance of the $P_3P_3'P_4P_4'$ bridge circuit. Thus, if the plane of the flame front is horizontal (or all points of the conducting flame front are roughly equidistant from all probes) then both bridge circuits will remain balanced. If, however, one portion of the flame front has channelled ahead or lags behind the remainder, the conducting layer will appear tilted. This tilt will be reflected in an unbalanced condition in the pair immediately above the anomaly. As before, the degree and direction of the imbalance reflects the orientation of the flame front. The use of more than two pairs of bridged probes allows more precise and detailed information concerning specific segments of the flame front.

Information concerning specific segments of the flame front is also obtained by sequentially determining the resistances between a number of probes. For example, in FIG. 4, the $P_1$—$P_2$ then the $P_1$—$P_3$, then the $P_1$—$P_4$, then the $P_1$—$P_3'$, etc., resistances are sequentially determined and recorded. Thus, suitable switching circuitry allows a series of resistance values to be obtained between $P_1$ (the "base" probe) and each additional probe in the sequence. This sequence is then repeated with each of the other probes acting in turn as the "base" probe. Acquisition, rationalization, and analysis of these sequential readings is performed by a computer monitoring system to define more sharply the flame front conditions. Alternatively, readings from sequential pairs may be taken as well. That is, the $P_1$—$P_2$, the $P_2$—$P_3'$, the $P_3'$—$P_4'$, etc., resistances are determined, monitored and analyzed by computer to provide detailed information concerning a portion of the flame front.

The sequential probe or sequential pair techniques are uniquely useful where probes are placed in a shaft commonly present near a retort. A shaft is generally bored parallel to one retort sidewall for access to cross tunnels which are used to place rubblizing explosive charges. This shaft remains after retort construction. A series of probes spaced down the shaft would permit high resolution sequential resistance measurements between the shaft probes and surface probes.

While this invention has its preferable application to monitoring flame fronts and vertical retorts it is readily applicable to other forms of underground combustion. Flame fronts proceeding horizontally, obliquely to the surface, or in several directions simultaneously can be monitored and tracked with an appropriate choice of single pair, bridged pair and multiple bridge circuits providing accuracy and precision tailored to the circumstances.

The sensitivity of these probes is an important factor to consider when determining the dimensions of the necessary circuit elements. As previously noted the resistance of the ground is normally extremely high. Therefore, it is advisable to choose extremely high resistance values for the known resistance elements in the bridge circuits, $R_1$ and $R_2$. This will yield a circuit having higher sensitivity to small adjustments of the variable resistor, $R_3$. In addition, there must be extremely good electrical contact between the probes and the ground to facilitate the detection of small resistance variations. To achieve this, the probes must be highly conductive and driven into the ground a distance over five feet. To minimize surface water effects, deeper penetration (perhaps as much as 100 feet) may be desirable—the depth being limited only by the cost of drilling the required distance.

The effectiveness of the probes in detecting small resistance changes is also dependent upon the probe composition. The probes should be highly conducting, preferably of metal or metal alloy. The probes may be solid conductor, or formed of insulating material or carbon and coated with highly conductive metal or metal alloys. The optimum choice for probe composition may best be decided with reference to the particular ground conditions and the depth to which the probe is to be driven in a particular application.

It is also apparent that for such small resistance variations, extraneous surface effects may mask responses to the flame front. In particular, various subterranean strata, certain ores, and horizontal aquifers may appear electrically conducting relative to the surrounding rock under certain conditions. As this method is dependent of the resistivity of the ground between the probes it would also be affected by rainfall and moisture in the soil.

Effects from surface or underground factors may be alleviated by effective calibration techniques. One simple method of determining the nature and extent of extraneous "background conductors" would be to simply establish balance conditions prior to ignition or arrival of the flame front. These normal conditions would then be a reference point establishing the magnitude and character of the "background" signals. In this way the resistance change caused only by the flame front can be differentiated from conductivity changes caused by other factors.

To accurately determine the progress of the flame front, and to ascertain its depth and tilt as well, it will be necessary to calibrate the circuits at least once using some more conventional detection means. Thus, a direct relationship between the distance to the flame front in feet and the magnitude of the change in resistance in ohms can be empirically established and formulated. Once this formula is obtained it may be applied to a variety of situations involving such resistance probes.

While specific descriptions herein have been with respect to one, two and four pairs of probes, it is understood that those skilled in the art will recognize modifications and configurations involving any number of probes without departing from the scope of this invention. In addition, single pairs and multiple pairs in bridge circuits may be used in tandem and correlated to provide information concerning a flame front to whatever accuracy and precision desired.

Accordingly, the foregoing description is to be construed as illustrative only. It is not to be construed as a limitation upon the invention as defined in the following claims.

I claim:

1. In the in situ combustion of a subterranean carbonaceous stratum, a method for detecting the flame front comprising
   (a) providing two or more stationary probes inserted into the ground electrically connected in one or more circuits capable of measuring the resistance between pairs of probes,
   (b) monitoring the change in resistance between two or more stationary probes during the combustion in one or more of said circuits and providing an indication of the location, pattern and orientation of said flame front in response to said monitored change in resistance.

2. The method of claim 1 wherein all of said probes are located outside the boundaries of the expected combustion site.

3. The method of claim 1 wherein said probes are metal stakes driven to a depth greater than approximately five feet into the ground.

4. The method of claim 1 wherein one or more of said circuits comprise a modified Wheatstone Bridge circuit comprising four or more branches, wherein at least one branch contains a pair of probes, at least one branch contains a variable resistor, and all other branches contain one or more resistors having a known resistance value.

5. The method of claim 4 wherein one pair of probes and one modified Wheatsone Bridge having four branches is employed.

6. The method of claim 5 wherein the adjustment of the variable resistor required to maintain balance conditions is correlated with the location and movement of said flame front.

7. The method of claim 4 wherein two branches of said circuit each contain a different pair of probes and the adjustment of the variable resistor required to maintain balance conditions is correlated with the extent and movement of said flame front.

* * * * *